(12) United States Patent
Yoneyama

(10) Patent No.: US 9,331,745 B2
(45) Date of Patent: May 3, 2016

(54) ELECTRONIC DEVICE AND COMMUNICATION SYSTEM FOR MEDIATING ESTABLISHMENT OF COMMUNICATION BETWEEN PLURALITY OF COMMUNICATION DEVICES

(71) Applicant: Panasonic Corporation, Osaka (JP)

(72) Inventor: Masayuki Yoneyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 151 days.

(21) Appl. No.: 13/848,114

(22) Filed: Mar. 21, 2013

(65) Prior Publication Data

US 2013/0252546 A1 Sep. 26, 2013

(30) Foreign Application Priority Data

Mar. 21, 2012 (JP) .................................. 2012-063017

(51) Int. Cl.
*H04B 5/00* (2006.01)
*H04W 4/00* (2009.01)
*H04W 76/02* (2009.01)

(52) U.S. Cl.
CPC ................. *H04B 5/00* (2013.01); *H04W 4/008* (2013.01); *H04W 76/02* (2013.01)

(58) Field of Classification Search
None
See application file for complete search history.

(56) References Cited

U.S. PATENT DOCUMENTS

| | | | |
|---|---|---|---|
| 2003/0231608 A1* | 12/2003 | Wentink | 370/338 |
| 2005/0172020 A1 | 8/2005 | Koga | |
| 2007/0288656 A1* | 12/2007 | Liang et al. | 709/245 |
| 2010/0093278 A1* | 4/2010 | Abel et al. | 455/41.1 |
| 2012/0208461 A1* | 8/2012 | Choi et al. | 455/41.2 |
| 2012/0322368 A1* | 12/2012 | Desai et al. | 455/41.1 |

FOREIGN PATENT DOCUMENTS

| | | |
|---|---|---|
| JP | 2005-204099 | 7/2005 |
| JP | 2006-195627 | 7/2006 |
| JP | 2008-181319 | 8/2008 |
| JP | 2009-060526 | 3/2009 |

\* cited by examiner

*Primary Examiner* — Ping Hsieh
*Assistant Examiner* — James Yang
(74) *Attorney, Agent, or Firm* — Panasonic Patent Center

(57) ABSTRACT

An electronic device includes a communication unit configured to communicate with a first communication device or a second communication device, and a controller configured to control the communication through the communication unit. When the electronic device is brought close to the first communication device, the controller obtains identification information indicating the first communication device from the first communication device, and when the electronic device is brought close to the second communication device, the controller transmits the identification information and predetermined additional information to the second communication device. The second communication device activates an operation for establishing communication with the first communication device indicated by the identification information, when receiving the identification information and the predetermined additional information.

6 Claims, 10 Drawing Sheets

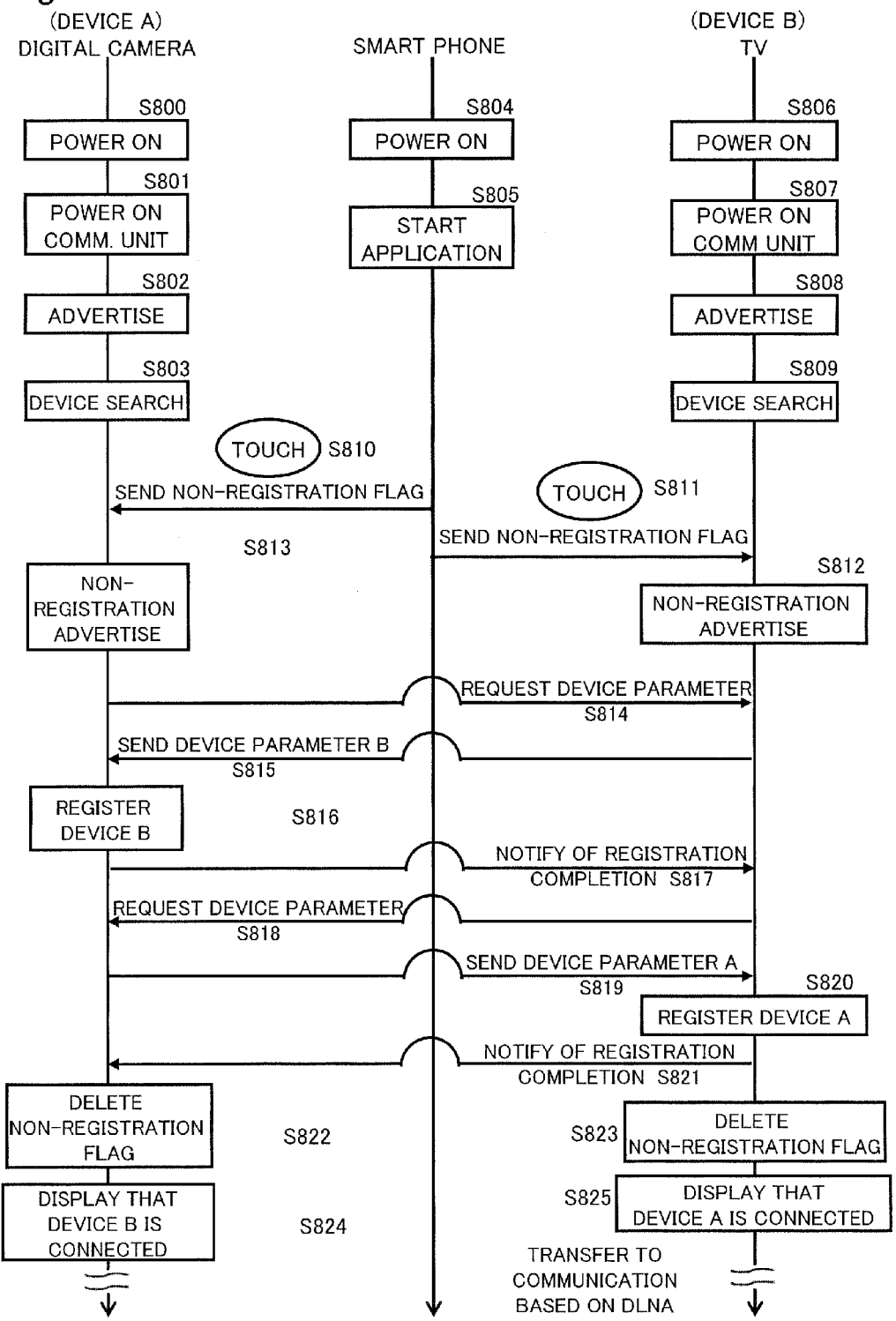

ELECTRONIC DEVICE AND COMMUNICATION SYSTEM FOR MEDIATING ESTABLISHMENT OF COMMUNICATION BETWEEN PLURALITY OF COMMUNICATION DEVICES

BACKGROUND

1. Technical Field

The present disclosure relates to an electronic device and a communication system for mediating establishment of communication between a plurality of communication devices.

2. Related Art

Techniques for connecting devices via radio waves or wires so that the devices can communicate with each other have become widespread. Japanese Patent Application Laid-Open No. 2006-195627 describes a mobile phone that obtains a communication ID from a receiving terminal through non-contact communication and transmits the obtained communication ID to a digital camera through wireless communication. Further, it describes an image data communication process performed between the receiving terminal and the digital camera through wireless communication.

SUMMARY

In recent years, frequency of sharing data between a plurality of devices, and places where users establish communication between devices have increased. Thus it is desired for users to more easily and intuitively establish communication between the devices.

A concern of the present disclosure is providing an electronic device that enables a user to establish communication between devices easily and intuitively.

In a first aspect, an electronic device is provided which is capable of mediating establishment of communication between a first communication device and a second communication device. The electronic device includes a communication unit configured to communicate with the first communication device or the second communication device, and a controller configured to control the communication through the communication unit. When the electronic device is within a predetermined distance to the first communication device, the controller obtains identification information indicating the first communication device from the first communication device through the communication unit. When the electronic device is within a predetermined distance to the second communication device, the controller transmits the identification information and predetermined additional information to the second communication device via the communication unit. The identification information indicating the first communication device can be used by the second communication device to activate an operation for establishing communication with the first communication device indicated by the identification information, when the second communication device receives the identification information and the predetermined additional information.

In a second aspect, an electronic device is provided which is capable of mediating establishment of communication between a first communication device and a second communication device. The electronic device includes a communication unit configured to communicate with the first communication device or the second communication device, and a controller configured to control the communication through the communication unit. When the electronic device is within a predetermined distance to the first communication device, the controller transmits predetermined additional information to the first communication device through the communication unit. When the electronic device is within a predetermined distance to the second communication device, the controller transmits the predetermined additional information to the second communication device through the communication unit. The predetermined additional information can be used to by the second communication device to activate an operation for establishing communication with the first communication device having the predetermined additional information, when the second communication device receives the predetermined additional information.

In a third aspect, a method is provided for establishing communication between a first communication device and a second communication device via an electronic device. The method includes obtaining, by the electronic device, identification information indicating the first communication device from the first communication device, when the electronic device is brought within a predetermined proximity of the first communication device (ex. a distance enabling proximity communication with the first communication device); transmitting, by the electronic device, the identification information and predetermined additional information to the second communication device, when the electronic device is brought within a predetermined proximity of the second communication device (ex. a distance enabling proximity communication with the second communication device); and when receiving the identification information and the predetermined additional information, the second communication device performs an operation for establishing communication with the first communication device indicated by the identification information.

In a fourth aspect, a method is provided for establishing communication between a first communication device and a second communication device via an electronic device. The method includes transmitting, by the electronic device, predetermined additional information to the first communication device, when the electronic device is brought within a predetermined proximity of the first communication device; and transmitting, by the electronic device, the predetermined additional information to the second communication device, when the electronic device is brought within a predetermined proximity of the second communication device. When receiving the predetermined additional information, the second communication device performs an operation for establishing communication with the first communication device having the predetermined additional information.

The present disclosure can provide an electronic device that enables a user to establish communication between a plurality of communication devices more easily and more intuitively.

BRIEF DESCRIPTION OF DRAWINGS

FIG. 10 is a diagram illustrating the establishment of communication according to the second embodiment.

DETAILED DESCRIPTION OF PREFERRED EMBODIMENTS

Embodiments are described below in detail suitably with reference to the drawings. However, unnecessarily detailed description may be omitted. For example, detail description of already known matters and redundant description of substantially the same configurations may be omitted. All of such omissions are for facilitating understanding by those skilled in the art by preventing the following description from becoming unnecessarily redundant. The accompanying drawings and the following description are provided for those skilled in the art to sufficiently understand the present disclosure, and are not intended to limit the subject described in the claims.

First Embodiment

Figure 1:
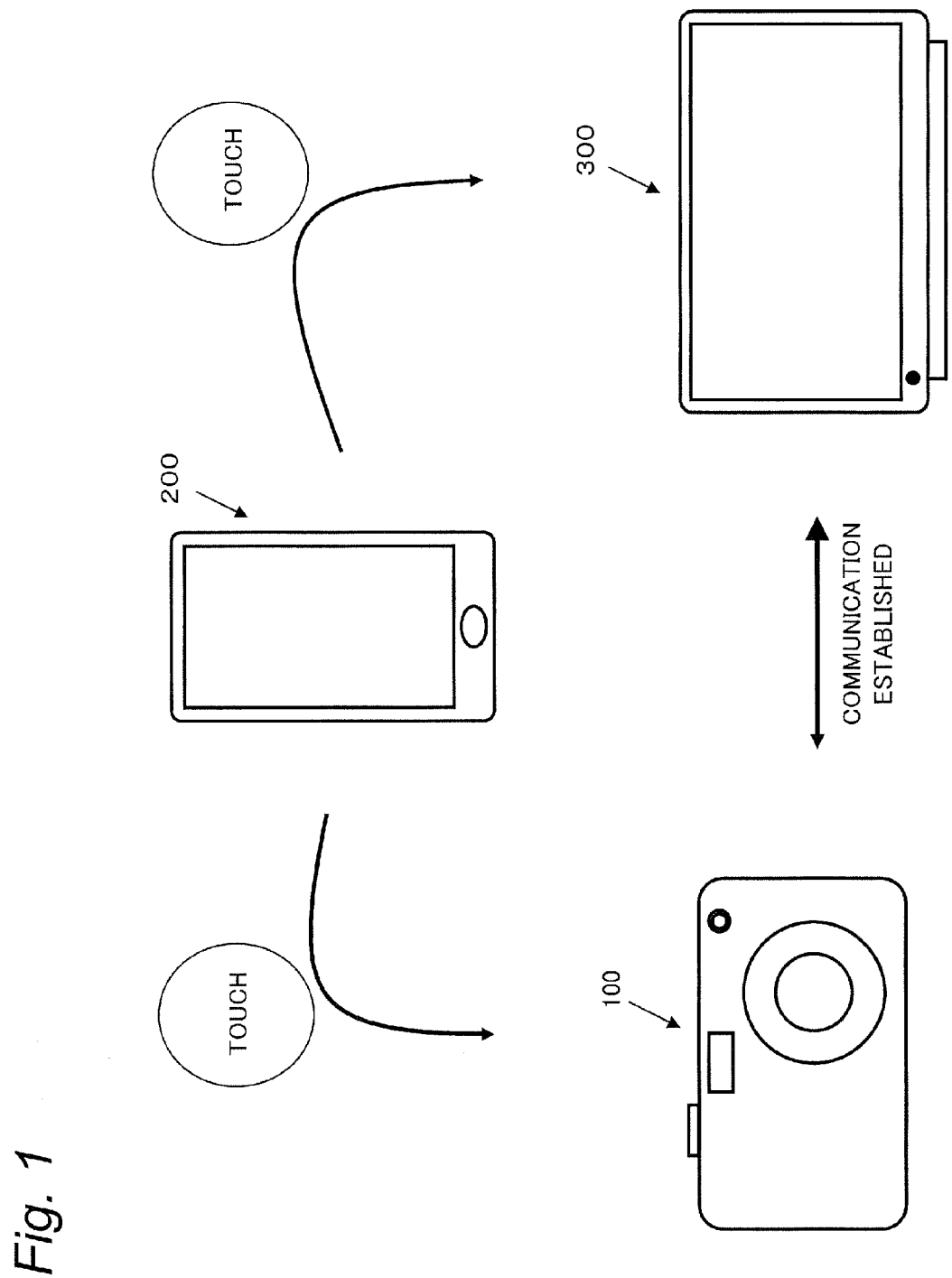
FIG. 1 is an image diagram illustrating a mediating operation for establishing communication using a smart phone.

FIG. 1 illustrates a configuration of a communication system according to a first embodiment. A digital camera 100 and a television receiver 300 according to the first embodiment are devices manufactured in conformity with the DLNA (Digital Living Network Alliance) guidelines, and they can establish communication with each other based on the DLNA guidelines.

A smart phone 200 according to the first embodiment mediates establishment of communication between the digital camera 100 and the television receiver 300 using a proximity communication unit such as NFC (Near Field Communication). FIG. 1 is a diagram describing a mediating operation for the establishment of communication using the smart phone 200. A user brings the smart phone 200 close to the respective predetermined regions of the digital camera 100 and the television receiver 300 (touch operation) so as to cause information necessary for the establishment of communication between the digital camera 100 and the television receiver 300 to be communicated between the digital camera 100 and the television receiver 300.

Configurations and operations of respective devices are described below in regard to the mediating operation for the establishment of communication between the digital camera 100 and the television receiver 300 using the smart phone 200 according to the first embodiment.

1-1. Configuration

Configurations of the digital camera 100, the smart phone 200 and the television receiver 300 according to the present disclosure are described below with reference to the drawings.

1-1-1. Configuration of Digital Camera

Figure 2:
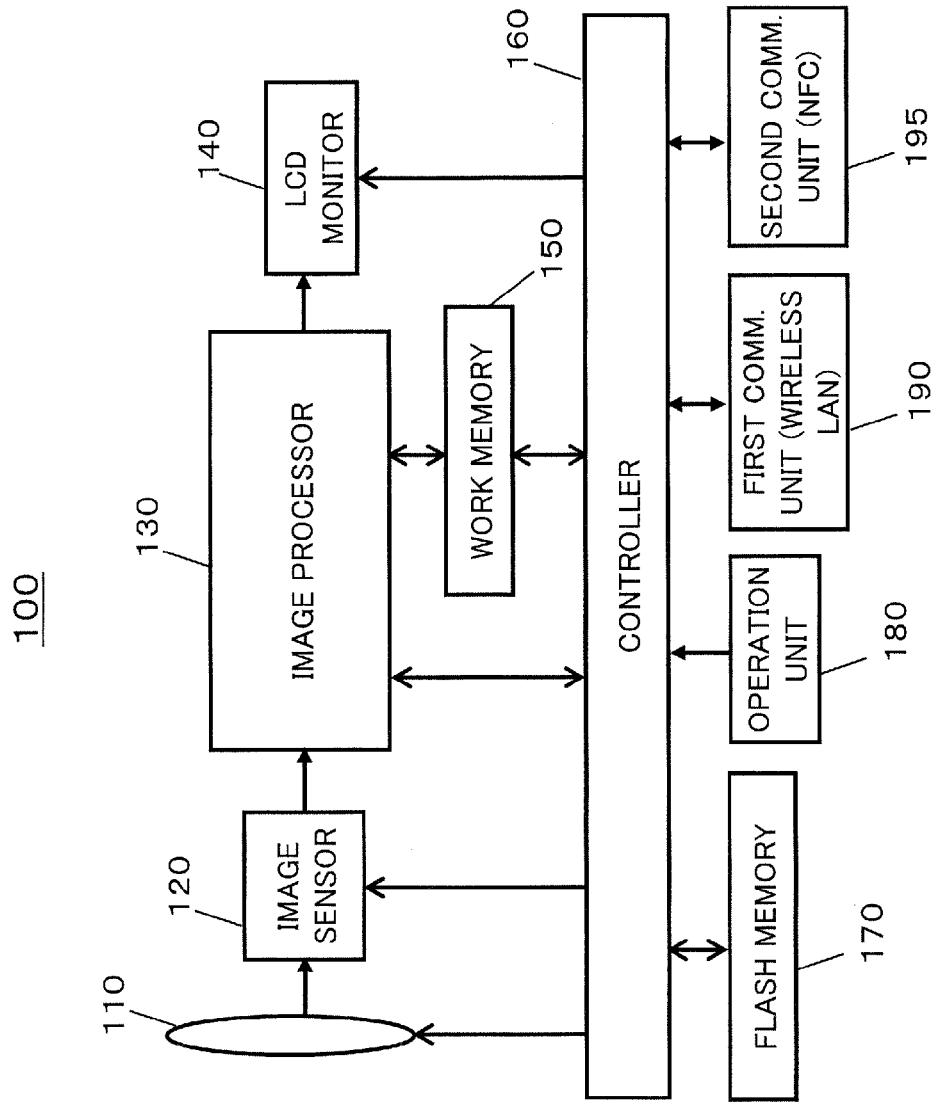
FIG. 2 is an electrical configuration diagram illustrating a digital camera.

FIG. 2 is an electrical configuration diagram illustrating the digital camera 100. The digital camera 100 captures a subject image formed via an optical system 110 with an image sensor 120. The image sensor 120 generates image data based on the captured subject image. The image data generated by capturing is subject to various processes in an image processor 130. The generated image data is recorded in a recording medium such as a flash memory 170. The image data recorded in the recording medium such as the flash memory 170 is displayed on a liquid crystal display (LCD) monitor 140 upon the reception of an operation of an operation unit 180 from the user.

The optical system 110 is configured by a focus lens, a zoom lens, a diaphragm, a shutter, and so on. The optical system 110 may include an optical camera shake correcting lens (OIS: Optical Image Stabilizer). Various lenses constituting the optical system 110 may be configured by any number of lenses or any number of groups of lenses.

The image sensor 120 captures a subject image formed through the optical system 110 to generate image data. The image sensor 120 generates a new frame of image data at a predetermined frame rate (for example, 30 frames/sec). Image data generation timing and an operation of an electronic shutter of the image sensor 120 are controlled by a controller 160. The image data is displayed as a through image on the liquid crystal display monitor 140 in real time, so that the user can check a condition of a subject on the liquid crystal display monitor 140 in real time.

The image processor 130 executes various processes on the image data output from the image sensor 120. Examples of the various processes are smear correction, white balance correction, gamma correction, a YC converting process, an electronic zoom process, a compressing process and a decompressing process, but the processes are not limited thereto. The image processor 130 may be implemented by a hard-wired electronic circuit or by a microcomputer for executing a program. Further, the image processor 130 may be integrated into one semiconductor chip together with the controller 160 or the like.

The liquid crystal display monitor 140 is provided to a rear surface of the digital camera 100. The liquid crystal display monitor 140 displays an image based on the image data processed in the image processor 130. The image to be displayed on the liquid crystal display monitor 140 includes a through image and a recording image.

The controller 160 generally controls an entire operation of the digital camera 100. The controller 160 may be implemented by a hard-wired electronic circuit or by a microcomputer for executing a program. Further, the controller 160 may be integrated into one semiconductor chip together with the image processor 130 or the like.

The flash memory 170 functions as an internal memory for recording image data. Further, the flash memory 170 stores programs for autofocus control (AF control) and communication control, and also a program for controlling the entire operation of the digital camera 100. The flash memory 170 also stores an application for realizing the mediating operation through the smart phone 200.

A work memory 150 is a storage unit that functions as work memories for the image processor 130 and the controller 160. The work memory 150 can be realized by DRAM (Dynamic Random Access Memory) or the like.

The operation unit 180 is a general name of an operation button or an operation lever provided to a casing of the digital camera 100, and accepts an operation from the user. When accepting an operation from the user, the operating section 180 notifies the controller 160 of various operation instructing signals.

A first communication unit 190 is a wireless or wired communication interface. The controller 160 can be connected to the Internet via an access point, for example, by means of the first communication unit 190. The first communication unit 190 is an interface connectable to wireless LAN and wired LAN, for example. The digital camera 100 according to the first embodiment is connected to the Internet via an access point using wireless LAN.

A second communication unit 195 includes a tag for realizing communication by means of NFC (Near Field Communication). The user brings an electronic device including a reader/writer close to the second communication unit 195 including a tag to establish non-contact proximity communication. Details of configurations and operations of the tag and the reader/writer are described later.

1-1-2. Configuration of Smart Phone

Figure 3:
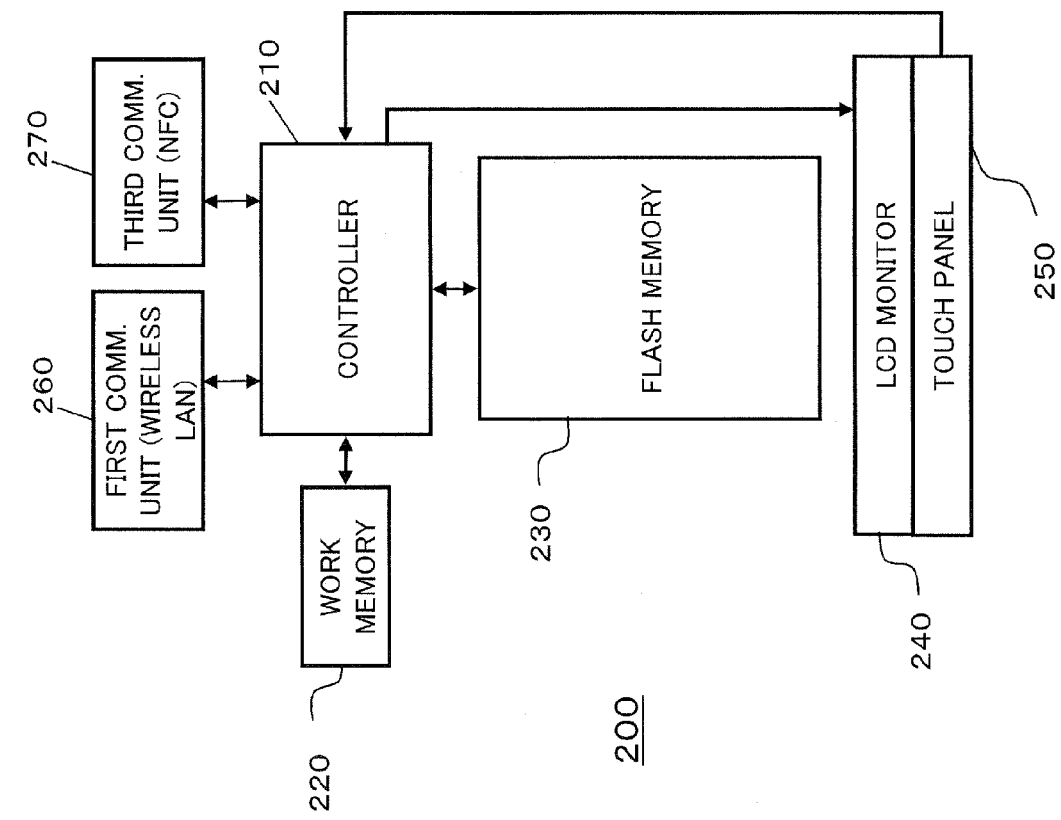
FIG. 3 is an electrical configuration diagram illustrating the smart phone.

The configuration of the smart phone 200 is described with reference to FIG. 3. FIG. 3 is an electrical configuration diagram illustrating the smart phone 200.

The smart phone 200 includes a controller 210, a work memory 220, a flash memory 230, a liquid crystal display monitor 240, a touch panel 250, a first communication unit 260, and a third communication unit 270. The smart phone 200 may include an image capturing device and an image processor (not shown).

A controller 210 is a processor for executing processes in the smart phone 200. The controller 210 is electrically connected to the work memory 220, the flash memory 230, the first communication unit 260, the third communication unit 270, the liquid crystal display monitor 240, and the touch panel 250. The controller 210 may be implemented by a hard-wired electronic circuit or by a microcomputer for executing programs. The controller 210 receives information about an operation from the user on the touch panel 250. The controller 210 can read data stored in the flash memory 230. Further, the controller 210 controls entire systems including a power control system for supplying powers to the respective units of the smart phone 200. The controller 210 can execute various applications downloaded via a telephone function or the Internet (not shown).

The work memory 220 is a memory for temporarily storing information necessary for the controller 210 to execute various operations.

The flash memory 230 is a recording medium for storing various data. Various data stored in the flash memory 230 can be read by the controller 210 as required. In this embodiment, the flash memory 230 is shown, but a hard disc drive may be used instead of the flash memory.

The liquid crystal display monitor 240 is a display device for displaying a screen indicated by the controller 210.

The touch panel 250 is an input device for receiving information about an operation by the user. In this embodiment, the touch panel 250 is shown as an input device for receiving the information about an operation by the user, but hard keys may be used instead of the touch panel.

The first communication unit 260 is a wireless or wired communication interface. The controller 210 can be connected to the Internet via an access point, for example, by means of the first communication unit 260. Further, the first communication unit 260 can be realized by an interface connectable to wireless LAN and wired LAN. The smart phone 200 according to the first embodiment is connected to the Internet via an access point using wireless LAN.

The third communication unit 270 is implemented by the reader/writer 600 for realizing communication by means of NFC (Near Field Communication). The user brings the electronic device including the reader/writer 600 or the tag 500 close to the third communication unit 270 including the reader/writer 600 to enable non-contact proximity communication. Configurations and operations of the tag 500 and the reader/writer 600 are described in detail later.

1-1-3. Configuration of Television Receiver

Figure 4:
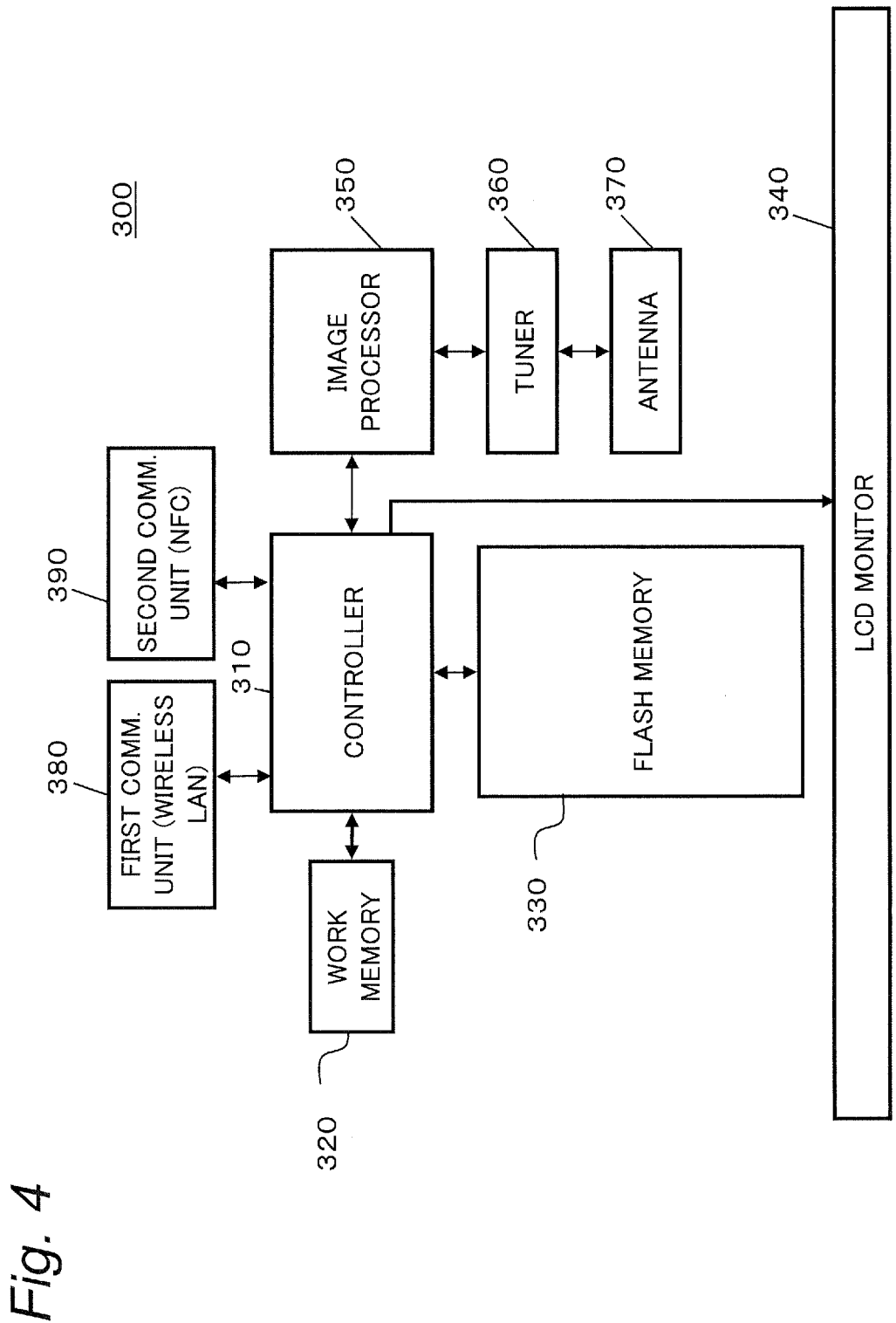
FIG. 4 is an electrical configuration diagram illustrating a television receiver.

A configuration of the television receiver 300 is then described with reference to FIG. 4. FIG. 4 is an electrical configuration diagram illustrating the television receiver 300.

The television receiver 300 includes a controller 310, a work memory 320, a flash memory 330, a liquid crystal display monitor 340, an image processor 350, a tuner 360, an antenna 370, a first communication unit 380, and a second communication unit 390.

The antenna 370 receives an electromagnetic wave transmitted from an external broadcasting station. The tuner 360 extracts a video signal of a target channel from the electromagnetic wave received via the antenna 370, and outputs the video signal to the image processor 350.

The image processor 350 executes various image processes on the video signal obtained from the tuner 360. For example, the image processor 350 executes various processes such as gamma correction and flaw correction on the video signal obtained from the tuner 360. The image processor 350 executes various image processes on the video signal obtained from the tuner 360. The image processor 350 can be implemented by DSP or a microcomputer.

The controller 310 controls an entire operation of the television receiver 300. The controller 310 may be implemented by a hard-wired electronic circuit or by a microcomputer for executing programs. Further, the controller 310 may be integrated into one semiconductor chip together with the image processor 350 or the like.

The liquid crystal display monitor 340 is a display device for displaying a screen controlled by the controller 310. The controller 310 outputs the video signal that is subject to the various image processes by the image processor 350 to the liquid crystal display monitor 340.

The work memory 320 is a memory for temporarily storing information necessary for the controller 310 to execute the various processes.

The flash memory 330 is a recording medium for storing various data. The various data stored in the flash memory 330 can be read to the controller 310 as required, as described above. In this embodiment, the flash memory 330 is shown, but a hard disc drive may be used instead of the flash memory.

The first communication unit 380 is a wireless or wired communication interface. The controller 310 can be connected to the Internet via an access point, for example, by means of the first communication unit 380. Further, the first communication unit 380 can be realized by an interface connected to wireless LAN and wired LAN. The television receiver 300 according to the first embodiment is connected to the Internet via an access point using wireless LAN.

A second communication unit 390 includes a tag for realizing communication by means of NFC (Near Field Communication). The user brings the electronic device including a reader/writer close to the second communication unit 195 including a tag to enable non-contact proximity communication. Configurations and operations of the tag and the reader/writer are described in detail later.

1-1-4. Configurations of Tag and Reader/Writer

Figure 5:
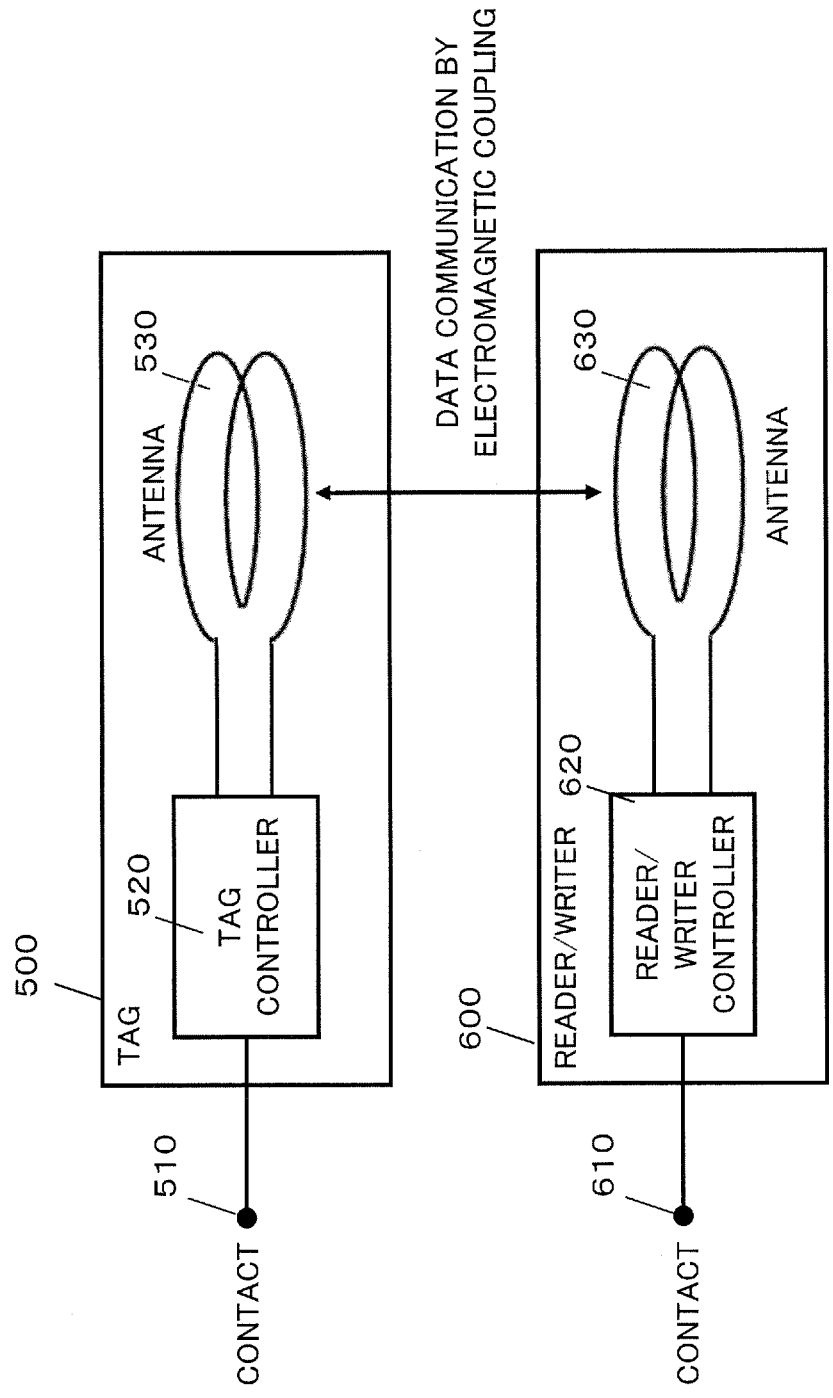
FIG. 5 is an electrical configuration diagram illustrating a tag and a reader/writer.

Configurations and operations of the tag 500 and the reader/writer 600 are described. FIG. 5 is an electrical configuration diagram illustrating the tag 500 and the reader/writer 600.

As shown in FIG. 5, the tag 500 includes a contact 510, a tag controller 520, and an antenna 530. The reader/writer 600 includes a contact 610, a reader/writer controller 620, and an antenna 630.

The contact 510 is electrically connected to the controller 160 of the digital camera 100 having the second communication unit 195. That is, the controller 160 of the digital camera 100 is connected to the tag controller 520 via the contact 510. Similarly, the contact 510 is electrically connected to the controller 310 of the television receiver 300 having a second communication unit 390. That is, the controller 310 of the television receiver 300 is connected to the tag controller 520 via the contact 510.

The tag controller 520 is a controller that controls data communication of the tag 500. The tag controller 520 is realized by, for example, LSI.

The antenna 530 receives clock information transmitted from the antenna 630 of the reader/writer 600, using an electromagnetic coupling principle. The antenna 530 receives power supply from the antenna 630 of the reader/writer 600, using the electromagnetic coupling principle. The antenna 530 transmits/receives data with the antenna 630 of the reader/writer 600, using the electromagnetic coupling principle. More concretely, the data and the clock information received by the antenna 530 of the tag 500 are transmitted to a controller of a main body (the controller 160 of the digital camera 100 or the controller 310 of the television receiver 300) via the tag controller 520. Farther, the data transmitted by the controller of the main body (the controller 160 of the digital camera 100 or the controller 310 of the television receiver 300) can be transmitted to the reader/writer 600 via the antenna 530 by the tag controller 520.

The contact 610 is electrically connected to the controller 210 of the smart phone 200 having the third communication unit 270. The controller 210 of the smart phone 200 is connected to the reader/writer controller 620 via the contact 610.

The reader/writer controller 620 is a controller for controlling data communication of the reader/writer 600. The reader/writer controller 620 is realized by, for example, LSI.

The antenna 630 transmits data and clock information to the antenna 530 of the tag 500 according to the electromagnetic coupling principle under control of the reader/writer controller 620. The antenna 630 receives the data from the antenna 530 of the tag 500 according to the electromagnetic coupling principle under control of the reader/writer controller 620. Further, the antenna 630 supplies a power to the antenna 530 of the tag 500 according to the electromagnetic coupling principle.

When the reader/writer 600 and the tag 500 are positioned within a close distance (a distance enabling proximity communication, in a case of NFC, for example, within 10 cm), the antenna 630 of the reader/writer 600 and the antenna 530 of the tag 500 are electromagnetically coupled with each other, and thus the controllers of both devices can detect that the both devices comes close each other.

With such a configuration, the user enables data communication between the reader/writer 600 and the tag 500 by bringing the tag 500 and the reader/writer 600 close to each other (for example, within 10 cm).

1-2. Operation

Figure 6:
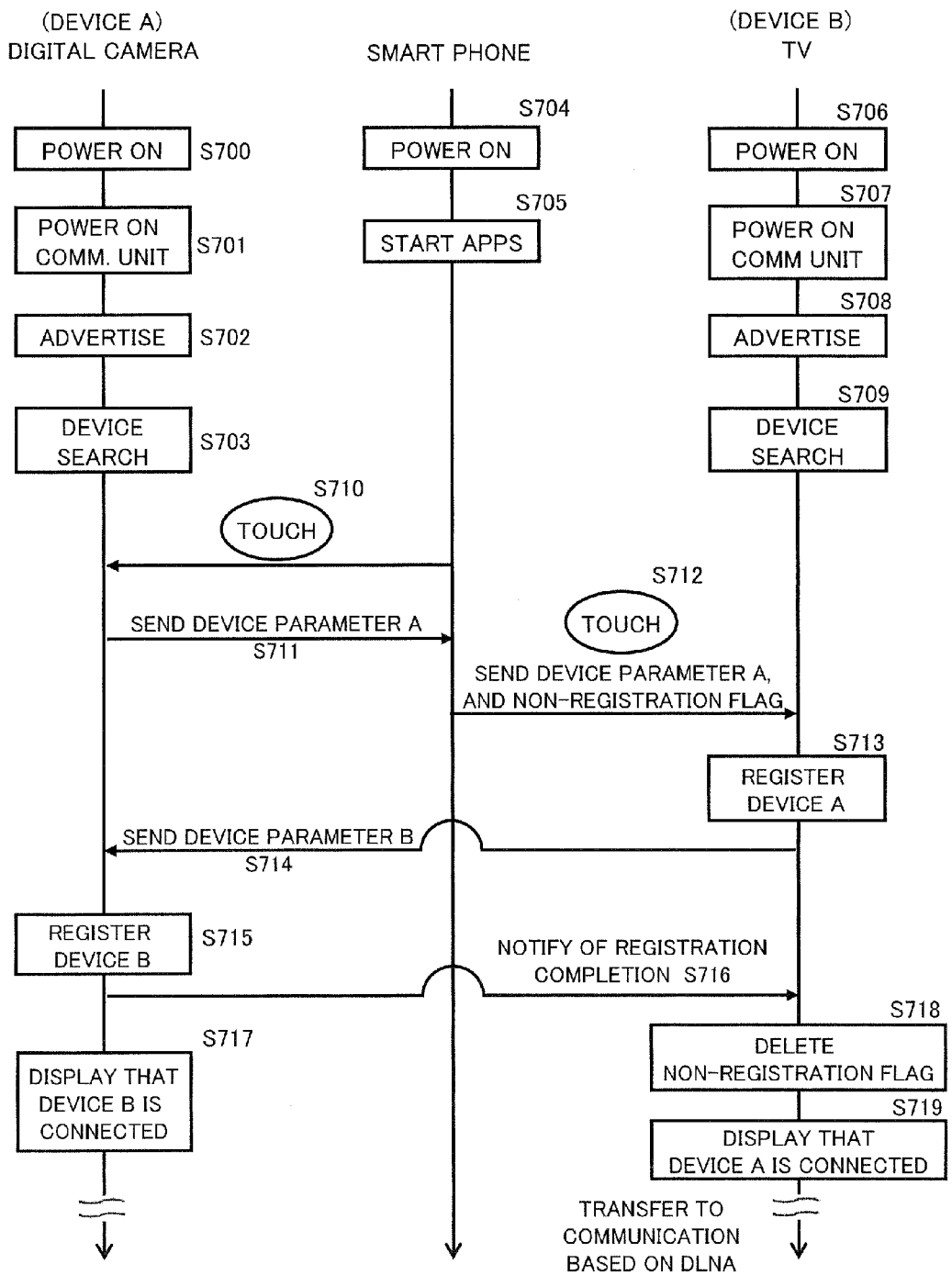
FIG. 6 is a flowchart illustrating an operation for mediating establishment of communication according to the first embodiment.
Figure 7:
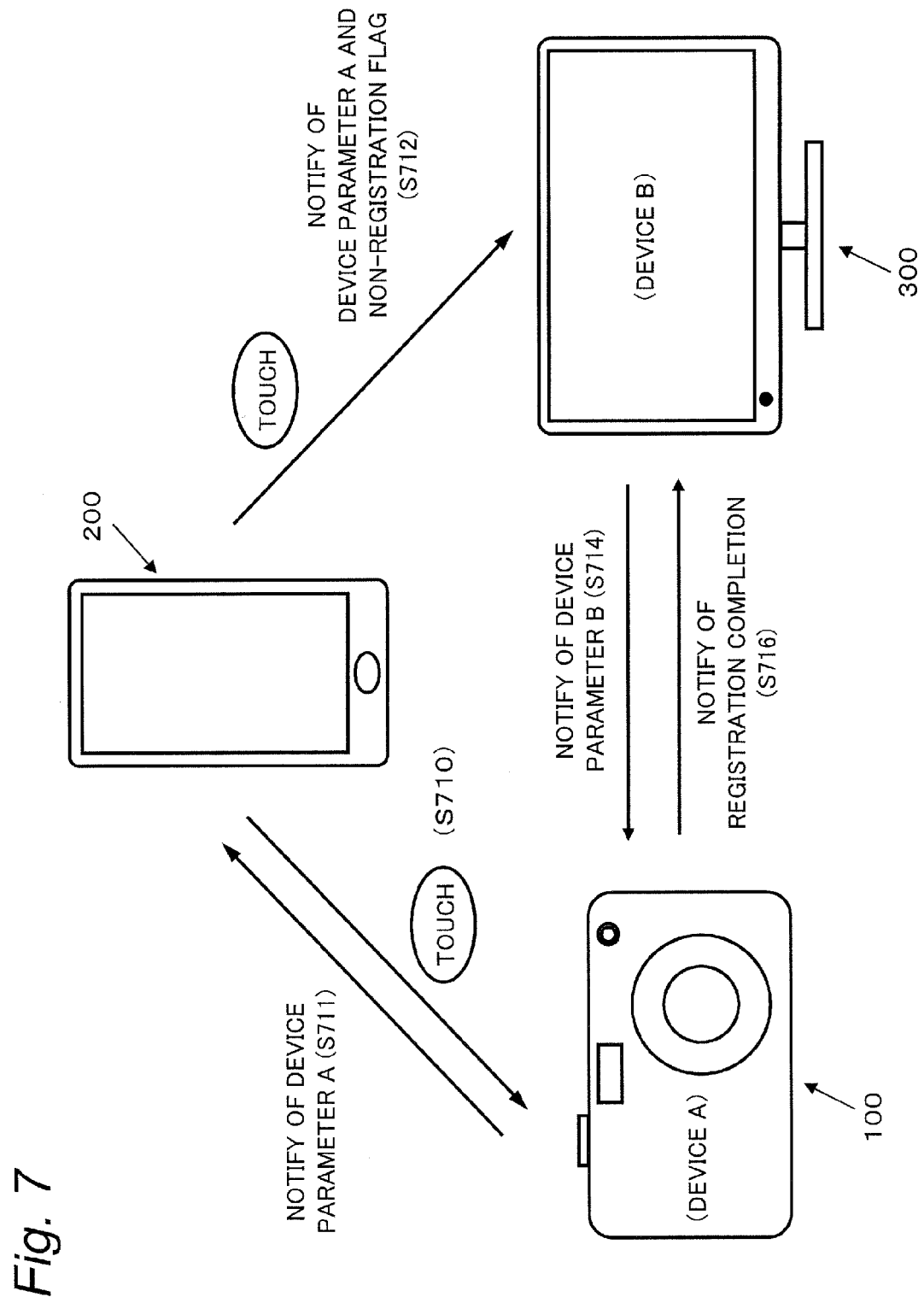
FIG. 7 is a diagram illustrating the establishment of communication according to the first embodiment.

A mediating process and an operation for mediating the establishment of communication between the digital camera 100 and the television receiver 300, using the smart phone 200, according to the first embodiment are described with reference to FIG. 6 and FIG. 7. FIG. 6 is a flowchart illustrating the mediating operation for the establishment of communication according to a first embodiment. FIG. 7 is a diagram for describing an operation for the establishment of communication according to the first embodiment. In the following description, the digital camera 100 is suitably referred to also as "device A", and the television receiver 300 as "device B".

As to the mediating operation for the establishment of communication, preparing operations in the digital camera 100, the smart phone 200, and the television receiver 300 are described first. In the following description, the digital camera 100 and the television receiver 300 have not registered each other as communication counterparts.

First, the preparing operation in the digital camera 100 is described. The controller 160 of the digital camera 100 receives a power ON operation from the user (S700). When receiving the power ON operation, the controller 160 supplies power to respective sections constituting the digital camera 100, and performs an initializing process for providing a photographable state. The controller 160 of the digital camera 100 supplies power also to the first communication unit 190 and the second communication unit 195 so as to bring the respective communication units 190 and 195 into the power ON state (S701).

When the first communication unit 190 receives the power supply, the controller 160 issues an "advertisement" representing that the digital camera 100 participates in a network, via the first communication unit 190 (S702). As a result, the digital camera 100 can notify other devices that participate in the network of presence of itself (the digital camera 100). When the second communication unit 195 receives power supply, proximity communication by means of NFC is enabled.

Thereafter, the controller 160 of the digital camera 100 makes a device search via the first communication unit 190 (S703). The device search is an operation for searching for another communication device that can communicate with the digital camera 100. The controller 160 of the digital camera 100 detects the advertisement issued by another communication device so as to be capable of finding another communication device that can communicate with the digital camera 100. As a result, presence of another device participating in the network can be found.

Next, the preparing operation in the smart phone 200 is described next. The controller 210 of the smart phone 200 receives a power ON operation from the user (S704). When receiving the power ON operation, the controller 210 supplies power to respective components composing the smart phone 200. Thereafter, the controller 210 receives an operation on the operation unit such as the touch panel 250 from the user. When application software for the mediating operation is selected by the user, the controller 210 activates the application software (S705). As a result, the user can mediate the establishment of communication between devices, such as the establishment of communication between the digital camera 100 and the television receiver 300, using the smart phone 200.

When application software for the mediating operation is activated, the controller 210 of the smart phone 200 supplies power to the third communication unit 270. As a result, the third communication unit 270 is activated so that proximity communication by NFC is enabled.

Next, the preparing operation in the television receiver 300 is described. The controller 310 of the television receiver 300 receives the power ON operation from the user (S706). When receiving the power ON operation, the controller 310 supplies power to the respective components constituting the television receiver 300 to enable screen display. Further, the controller 310 of the television receiver 300 supplies power also to the first communication unit 380 and the second communication unit 390 to bring the respective communication units 380 and 390 into the power ON state (S707).

When the first communication unit 380 receives the power supply, the controller 310 issues an "advertisement" representing that the television receiver 300 participates in a network, via the first communication unit 380 (S708). As a result, the television receiver 300 can notify another device, which participates in the network, of presence of itself (the television receiver 300). When the second communication unit 390 receives the power supply, the proximity communication by means of NFC is enabled.

Thereafter, the controller 310 of the television receiver 300 makes a device search via the first communication unit 380 (S709). The device search is an operation for searching for another communication device that can communicate with the television receiver 300. The controller 310 of the television receiver 300 detects the advertisement issued by another communication device so as to be capable of finding another communication device that can communicate with the television receiver 300. In this manner, it is possible to find presence of a device participating in the network.

With the above operation, the digital camera 100, the smart phone 200 and the television receiver 300 are brought into a state that the proximity communication by means of NFC is enabled.

A procedure performed by the user to establish communication between the digital camera 100 and the television receiver 300 via the smart phone 200 is described.

The user first holds the smart phone 200 in user's hand and brings the third communication unit 270 of the smart phone 200 close to the second communication unit 195 of the digital camera 100 (S710). When the proximity communication unit is NFC, the user moves the smart phone 200 close to the digital camera 100 within a distance of, for example, 10 cm. This is referred to here as "TOUCH", although it is not necessary for the smart phone 200 to make actual contact with the digital camera 100. When the controller 160 of the digital camera 100 detects that the third communication unit 270 of the smart phone 200 comes close via the second communication unit 195, it reads a device parameter A stored in the flash memory 170 of the digital camera 100. The device parameter A is a parameter identifying the digital camera 100. The controller 160 of the digital camera 100 notifies the controller 210 in the smart phone 200 of the read device parameter A via the second communication unit 195 and the third communication unit 270 of the smart phone 200 (S711). The controller 210 of the smart phone 200 stores the notified device parameter A in the flash memory 230.

Then the user moves the smart phone 200 held in his/her hand to a place where the television receiver 300 is installed and brings the third communication unit 270 of the smart phone 200 close to the second communication unit 390 of the television receiver 300 (S712). This is referred to here as "TOUCH", although it is not necessary for the smart phone 200 to make actual contact with the television receiver 300. When the controller 210 of the smart phone 200 detects that the second communication unit 390 of the television receiver 300 becomes close, via the third communication unit 270, it reads the device parameter A and a non-registration flag stored in the flash memory 230. The non-registration flag is a flag representing that each of the digital camera 100 and the television receiver 300 has not registered each other as the communication counterpart device. In this example, the non-registration flag is notified to the television receiver 300 regardless of whether the digital camera 100 and the television receiver 300 are actually registered to each other as the communication counterpart device.

The controller 210 of the smart phone 200 notifies the controller 310 in the television receiver 300 of the read device parameter A and non-registration flag via the third communication unit 270 and the second communication unit 390 of the television receiver 300 (S712).

When the controller 310 of the television receiver 300 receives the device parameter A and the non-registration flag, it stores them in the flash memory 330. The controller 310 of the television receiver 300 registers the digital camera 100 (device A) as the counterpart device with which the television receiver 300 starts to communicate when the television receiver 300 participates in a network (S713). Further, the controller 310 of the television receiver 300 determines that the digital camera 100 has not registered the television receiver 300 as the counterpart communication device based on the reception of the device parameter A and the non-registration flag. At this time, the television receiver 300 and the digital camera 100 recognize each other's presence based on the device searches at steps S703 and S709. For this reason, the controller 310 of the television receiver 300 directly notifies the controller 160 in the digital camera 100 of a device parameter B representing the television receiver 300 via the first communication unit 380 and the first communication unit 190 of the digital camera 100 (S714). That is, the controller 310 of the television receiver 300 notifies the controller 160 in the digital camera 100 of the device parameter B identifying the television receiver 300 using the non-registration flag received together with the device parameter A as a trigger.

The controller 310 of the television receiver 300 can determine whether the digital camera 100 is already registered as the counterpart communication device. Therefore, when the digital camera 100 is already registered as the counterpart communication device, the controller 310 of the television receiver 300 does not have to execute processes after step S713. That is, the controller 310 of the television receiver 300 does not have to notify the digital camera 100 of the device parameter B.

After receiving the device parameter B, the controller 160 of the digital camera 100 stores it in the flash memory 170. The controller 160 of the digital camera 100 registers the television receiver 300 (device B) as the counterpart device with which the digital camera 100 starts to communicate when the digital camera 100 participates in a network (S715). When the registration of the device B is completed, the controller 160 of the digital camera 100 notifies the controller 310 in the television receiver 300 of registration completion via the first communication unit 190 and the first communication unit 380 of the television receiver 300 (S716).

Further, after registration of the television receiver 300 (the device B) at step S715 and notification of the registration completion at step S716, the controller 160 of the digital camera 100 displays on the liquid crystal display monitor 140 that the television receiver 300 (device B) is registered as the counterpart communication device with which the digital camera 100 starts to communicate on participating in a network (S717). As a result, the user can know that the registration of the television receiver 300 is completed in the digital camera 100.

Below, the description is made to a case where the process in the flowchart shown in FIG. 6 is interrupted because the power is turned OFF before the digital camera 100 and the television receiver 300 have registered each other as the counterpart communication device. In this case, the non-registration flag remains in the flash memory 330 of the television receiver 300. The controller 310 repeats the operations at steps S714 to S716 based on the non-registration flag.

When the digital camera 100 and the television receiver 300 have registered each other as the counterpart communication device, the non-registration flag is unnecessary. For this reason, the controller 310 of the television receiver 300 receives the notification of the registration completion of step S716, and then erases the non-registration flag stored in the flash memory 330 (S718).

The controller 310 of the television receiver 300 displays on the liquid crystal display monitor 340 that the digital camera 100 (device A) is registered as the counterpart communication device with which the television receiver 300 starts to communicate when the television receiver 300 participates in the network (S719).

As described above, in the first embodiment, with the smart phone 200 used as a mediating device, the digital camera 100 and the television receiver 300 can register each other as the counterpart communication device which start communication upon their participating in a network. In the above described case the smart phone 200 touches the digital camera 100 before the television receiver 300. Further, when the smart phone 200 touches the television receiver 300, the smart phone 200 notifies the television receiver 300 of a non-registration flag as well as the device parameter A identifying the digital camera 100 (device A). However, the procedure of the mediating operation is not limited to this. That is, the smart phone 200 may first touch the television receiver 300 before the digital camera 100. In this case, the smart phone 200 may notify of the non-registration flag as well as the device parameter B identifying the television receiver 300 (device B) that is touched after the television receiver 300, thereby providing a similar effect.

In the above description, it is assumed that the digital camera 100 and the television receiver 300 are not registered to each other as the counterpart communication device. A case where the digital camera 100 and the television receiver 300 have been registered to each other as the counterpart communication device is described below with reference to FIG. 8.

Since the digital camera 100 already registers the television receiver 300, the device parameter B identifying the television receiver 300 (device B) is stored in the flash memory 170. Similarly, since the television receiver 300 already registers the digital camera 100, the device parameter A identifying the digital camera 100 (device A) is stored in the flash memory 330.

Figure 8:
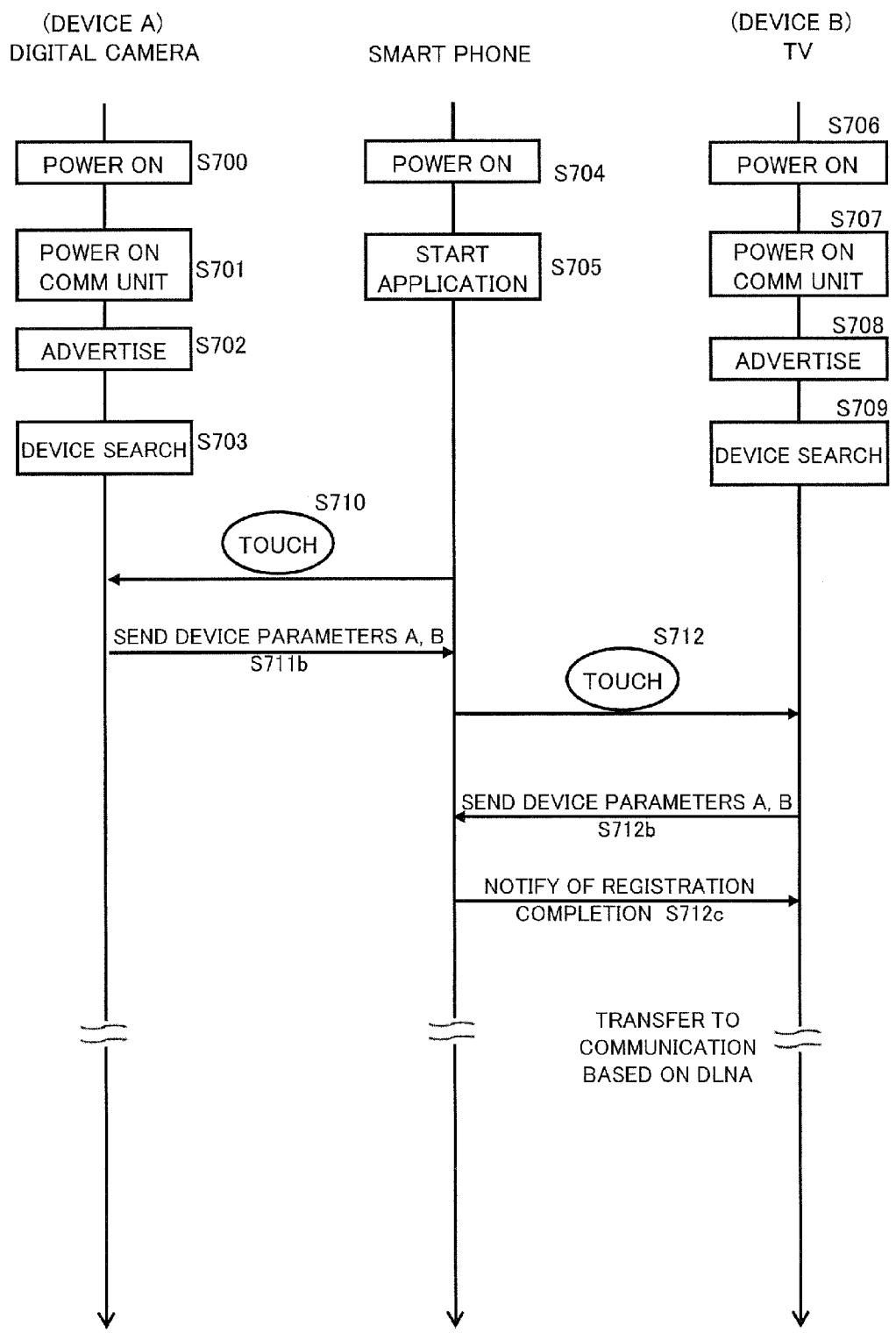
FIG. 8 is a flowchart illustrating another operation for mediating the establishment of communication according to the first embodiment.

In FIG. 8, steps S700 to S701 are similar to those in FIG. 6. When the digital camera 100 is touched by the smart phone 200 (S710) in a state that the respective devices have checked each other's presence on the network through a device search (namely, after step S709), the controller 160 of the digital camera 100 reads the device parameter A identifying the digital camera 100 (device A) and the device parameter B identifying the television receiver 300 (device B) stored in the flash memory 170. The controller 160 of the digital camera 100 notifies the controller 210 in the smart phone 200 of the read device parameter A and device parameter B (S711b).

Thereafter, when the television receiver 300 is touched by the smart phone 200 (step S712), the controller 310 of the television receiver 300 reads the device parameter B identifying the television receiver 300 and the device parameter A identifying the digital camera 100 stored in the flash memory 330. The controller 310 of the television receiver 300 notifies the controller 210 in the smart phone 200 of the read device parameter A and device parameter B (S712b). As a result, the controller 210 of the smart phone 200 obtains the device parameters A and B from the digital camera 100, and further obtains the device parameters A and B from the television receiver 300. Accordingly, the controller 210 of the smart phone 200 determines that the digital camera 100 and the television receiver 300 have been registered to each other as the counterpart communication device. At this time, the controller 210 of the smart phone 200 notifies the controller 310 in the television receiver 300 of a state where the devices are already registered each other rather than the non-registration flag (S712c). In another manner, the controller 210 of the smart phone 200 may display that the digital camera 100 and the television receiver 300 have been registered as the counterpart communication device on the liquid crystal display monitor 240 of the smart phone 200. At this time, since the registration is completed, the operation shown in FIG. 8 is completed.

As described above, the communication between the digital camera 100 and the television receiver 300 according to the first embodiment is not automatically established even when presence of each counterpart device is detected by the device search in each device, but is established by the registration operation actually performed. With such a control security is secured in conformity with the DLNA guidelines. According to the first embodiment, the security in conformity with the DLNA guidelines can be easily realized only by touching with the smart phone 200.

The smart phone 200 according to the first embodiment is the electronic device that can mediate the establishment of communication between the digital camera 100 and the television receiver 300. The smart phone 200 includes the third communication unit 270 for communicating with the digital camera 100 or the television receiver 300, and the controller 210 for controlling the communication through the third communication unit 270. When the smart phone 200 is brought close to the digital camera 100, the controller 210 obtains the device parameter A (one example of identification information) indicating the digital camera 100 from the digital camera 100 via the third communication unit 270. Thereafter, when the smart phone 200 is brought close to the television receiver 300, the controller 210 transmits the device parameter A and the non-registration flag (one example of additional information) to the television receiver 300 via the third communication unit 270. The television receiver 300 activates the operation for establishing the communication with the digital camera 100 indicated by the device parameter A when receiving the flag together with the device parameter A.

With the above configuration, the user can establish communication between two desired electronic devices by touching the respective electronic devices with the smart phone (or bringing the smart phone close to the respective electronic devices). As a result, while the security is being secured, the user can perform the operation for the establishment of communication easily and intuitively.

Second Embodiment

The second embodiment is described. The digital camera 100, the television receiver 300, a recorder 400 and a portable television 450 according to the second embodiment are devices manufactured in conformity with the DLNA (Digital Living Network Alliance) guidelines, and they can establish communication with each other in conformity with the DLNA guidelines.

The first embodiment describes a system in which the smart phone 200 notifies the non-registration flag as well as the device parameter. This type of system in which one device is notified of a device parameter of the other device in order to mediate the establishment of communication is referred to as a one-to-one mediating system for the establishment of communication. On the other hand, the system in the second embodiment does not manage the device parameter and can notify a plurality of communication devices using the non-registration flag. Thus the smart phone 200 can establish one-to-N communication (N is an integer of not less than 2).

Figure 9:
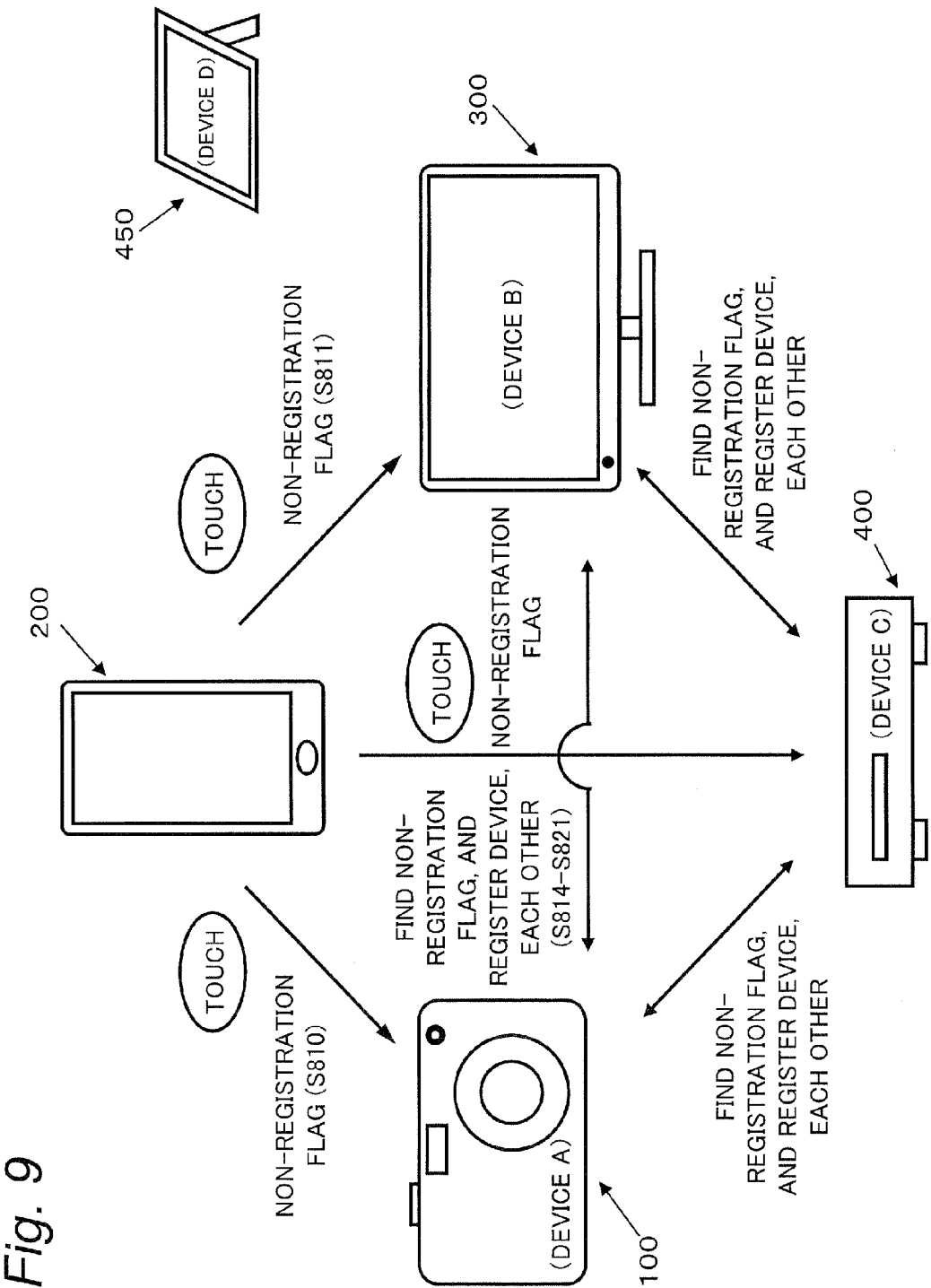
FIG. 9 is a flowchart illustrating the operation for mediating the establishment of communication according to a second embodiment.

Since the second embodiment adopts the mediating system for establishing one-to-N communication, for convenience of description, as shown in FIG. 9, the recorder 400 (device C) and the portable television 450 (device D) are further provided in addition to the digital camera 100, the smart phone 200 and the television receiver 300 provided in the first embodiment. Since the configurations of the digital camera 100, the smart phone 200 and the television receiver 300 are similar to those described in the first embodiment, description thereof is omitted. Configurations of the recorder 400 and the portable television 450 may include a communication interface (corresponding to the first communication unit 190, 260, and 380) realized by wireless LAN or wired LAN, and the tag 500 (corresponding to the second communication unit 195, and 390) for realizing communication by means of NFC (Near Field Communication) or the reader/writer 600 (the third communication unit 270). Description of components other than the communication units is omitted.

A mediating process and an operation for mediating the establishment of communication between the digital camera 100 (device A), the television receiver 300 (device B) and the recorder 400 (device C), using the smart phone 200, according to the second embodiment are described with reference to FIG. 9 and FIG. 10. FIG. 9 is a diagram for describing the establishment of communication according to the second embodiment. FIG. 10 is a flowchart describing a process for mediating the establishment of communication according to the second embodiment. The mediating system according to the second embodiment is a one-to-N system, however, for ease of description, in FIG. 10, a case where the establishment of communication between the digital camera 100 and the television receiver 300 is mediated by the smart phone 200 is described as an example. The smart phone 200 can similarly mediate the establishment of communication between the recorder 400 and another communication device according to the flow shown in FIG. 10.

As to the mediating operation for the establishment of communication, preparing operations in the digital camera 100, the smart phone 200, and the television receiver 300 are described first. In the following description, the digital camera 100 and the television receiver 300 are not yet registered to each other as the counterpart communication device. Since the preparing operations at steps S800 to S809 are similar to those at steps S700 to step 709 described with reference to FIG. 6, description thereof is omitted.

In a state that the respective devices have checked each other's presence on a network by means of the device search, the user brings the third communication unit 270 of the smart phone 200 close to the second communication unit 195 of the digital camera 100 with the smart phone 200 held by user's hand (S810). When the proximity communication unit is NFC, the devices are brought close to each other within a distance of, for example, 10 cm. When detecting proximity of the second communication unit 195 of the digital camera 100 via the third communication unit 270, the controller 210 of the smart phone 200 reads the non-registration flag stored in the flash memory 230 of the smart phone 200. The controller 210 of the smart phone 200 notifies the controller 160 in the digital camera 100 of the read non-registration flag via the third communication unit 270 and the second communication unit 195 (S810). The controller 160 of the digital camera 100 stores the notified non-registration flag in the flash memory 170.

Then the user moves to a place where the television receiver 300 is installed with the smart phone 200 held by his/her hand and then brings the third communication unit 270 of the smart phone 200 close to the second communication unit 390 of the television receiver 300. When detecting proximity of the second communication unit 390 of the television receiver 300 via the third communication unit 270, the controller 210 of the smart phone 200 reads the non-registration flag stored in the flash memory 230. The controller 210 of the smart phone 200 notifies the controller 310 in the television receiver 300 of the read non-registration flag via the third communication unit 270 and the second communication unit 390 (S811).

When receiving the non-registration flag from the smart phone 200, the controller 310 of television receiver 300 issues an advertisement (hereinafter, "non-registration advertisement") representing that the television receiver 300 has the non-registration flag via the first communication unit 380 (S812). In such a manner, when receiving the non-registration flag by touch of the smart phone 200, the television receiver 300 issues the non-registration advertisement. By issuing the non-registration advertisement, the television receiver 300 can notify another device, which participates in the network, of a state that television receiver 300 is not registered.

Similarly, when receiving the non-registration flag from the smart phone 200 (S810), the controller 160 of the digital camera 100 issues a non-registration advertisement via the first communication unit 190 (S813). With this control, the digital camera 100 can notify another device participating in the network of non-registration of itself (the digital camera 100).

When detecting the non-registration advertisement issued by another device, the detecting device requests a device parameter from the another device. In an example of FIG. 9, the digital camera 100 first detects the non-registration advertisement of the television receiver 300. At this time, the controller 160 of the digital camera 100 requests the device parameter from the controller 310 of the television receiver 300 via the first communication unit 190 and the first communication unit 380 (S814).

The controller 310 of the television receiver 300 receives the request of the device parameter, and reads the device parameter B stored in the flash memory 330 of the television receiver 300. The controller 310 of the television receiver 300 notifies the controller 160 in the digital camera 100 of the read device parameter B via the first communication unit 380 and the first communication unit 190 (S815).

When the device parameter B is notified to the controller 160 of the digital camera 100, the controller 160 stores the device parameter B in the flash memory 170. The controller 160 registers the television receiver 300 (device B) as the counterpart communication device at a time when the digital camera 100 participates in the network (S816). When the registration of the device B is completed, the controller 160 notifies the controller 310 in the television receiver 300 of the registration completion via the first communication unit 190 and the first communication unit 380 (S817). As a result, the controller 310 of the television receiver 300 recognizes that the controller 160 of the digital camera 100 registers the television receiver 300 as the counterpart communication device at the time of the establishment of communication.

When receiving the notification about the registration completion of step S818, the controller 310 of the television receiver 300 requests a device parameter from the controller 160 of the digital camera 100 via the first communication unit 380 and the first communication unit 190 (S818). The controller 160 of the digital camera 100 receives the request of the device parameter, and reads the device parameter A stored in the flash memory 170. The controller 160 notifies the controller 310 in the television receiver 300 of the read device parameter A via the first communication unit 190 and the first communication unit 380 (S819).

When receiving the device parameter A, the controller 310 of the television receiver 300 stores the parameter A in the flash memory 330. The controller 310 registers the digital camera 100 (device A) as the counterpart communication device with which the television receiver 300 starts to communicate when it participates in a network (S820). When the registration of the device A is completed, the controller 310 notifies the controller 160 in the digital camera 100 of the registration completion via the first communication unit 380 and the first communication unit 190 (S821). As a result, the controller 160 of the digital camera 100 recognizes that the controller 310 of the television receiver 300 registers the digital camera 100 as the counterpart communication device at the time of the establishment of communication. That is, at the completion of the operations at steps S817 and S821, the digital camera 100 and the television receiver 300 can recognize that they are registered to each other as the counterpart communication device.

Here a case is discussed, where the flowchart shown in FIG. 9 is interrupted due to a certain reason such as power off before the digital camera 100 and the television receiver 300 register each other as the counterpart communication devices. In this case, when the non-registration flags are stored in the flash memory 330 of the television receiver 300 and the flash memory 170 of the digital camera 100, the operations at step S814 to step S821 are repeated. In the above example, the digital camera 100 first requests a device parameter from the television receiver 300. However, when the television receiver 300 detects the non-registration advertisement of the digital camera 100 before detection of the non-registration advertisement by the digital camera 100, the television receiver 300 may first request a device parameter from the digital camera 100.

When the digital camera 100 and the television receiver 300 are completely registered to each other as the counterpart communication device, the non-registration flag is unnecessary. For this reason, the controller 160 of the digital camera 100 deletes the non-registration flag stored in the flash memory 170 (S822). Similarly, the controller 310 of the television receiver 300 deletes the non-registration flag stored in the flash memory 330 (S823).

The controller 160 of the digital camera 100 displays on the liquid crystal display monitor 140 that the television receiver 300 (device B) is registered as the counterpart communication device at the time when the digital camera 100 participates in the network (S824). Similarly, the controller 310 of the television receiver 300 displays on the liquid crystal display monitor 340 that the digital camera 100 (device A) is registered as the counterpart communication device at the time when the television receiver 300 participates in the network (S825).

With the above operation, communication between the digital camera 100 and the television receiver 300 can be established with the smart phone 200.

Each of the digital camera 100, the television receiver 300, the recorder 400, and the portable television 450 recognizes other's presence through the device search. The recorder 400 also obtains a non-registration flag according to the flowchart shown in FIG. 10 when touched by the smart phone 200. The recorder 400 issues an advertisement representing that it has the non-registration flag. Hence, the recorder 400 receives the request of a device parameter from each of other devices whose presences are recognized through the device search, or requests a device parameter from each other device whose presence is recognized through the device search. When the registration process is completely executed on all other devices, whose presences are recognized through the device search and which issue non-registration advertisements due to being touched by the smart phone 200, this process is ended. At this time, the presence of the portable television 450 is recognized by the digital camera 100, the television receiver 300 and the recorder 400 through the device search. However, the portable television 450 is not touched by the smart phone 200 and does not issue non-registration advertisement, and therefore the portable television 450 is not a target for registration by the other devices.

Accordingly, a simple touch operation with the smart phone 200 using proximity communication such as NFC can achieve mediation of the establishment of one-to-N communication.

As described above, the communication between the digital camera 100, the television receiver 300 and the recorder 400 according to the second embodiment is not automatically established even when presence of each counterpart device is detected by the device search in each device, but is established by the registration operation actually performed. With such a control, security is secured in conformity with the DLNA guidelines. According to the second embodiment, the security in conformity with the DLNA guidelines can be easily realized only by touching with the smart phone 200.

As described above, the smart phone 200 according to the second embodiment is the electronic device that can mediate the establishment of communication between the digital camera 100 and the television receiver 300. The smart phone 200 includes the third communication unit 270 for communicating with the digital camera 100 or the television receiver 300, and the controller 210 for controlling the communication through the third communication unit 270.

When the smart phone 200 is brought close to the digital camera 100, the controller 210 transmits the non-registration flag (one example of additional information) to the digital camera 100 via the third communication unit 270. Further, when the smart phone 200 is brought close to the television receiver 300, the controller 210 transmits the non-registration flag to the television receiver 300 via the third communication unit 270. The television receiver 300 activates the operation for establishing the communication with the digital camera 100 having the non-registration flag, when receiving the registration flag.

With the above configuration, the user can establish communication between two desired electronic devices by touching the respective electronic devices with the smart phone (or bringing the smart phone close to the respective electronic devices). That is, while the security is being secured, the user can perform the operation for the establishment of communication easily and intuitively.

Other Embodiments

The first to second embodiments have been described above as the examples of the technique disclosed in this application. However, the technique in this specification is not limited thereto, and can be also applied to embodiments in which modification, replacement, addition and omission are suitably carried out. A new embodiment can be provided by combining the respective components described in the first to second embodiments. Other embodiments are illustrated below.

The above embodiments described the case where the establishment of communication between devices manufactured based on the DLNA guidelines is mediated by the smart phone 200, but the present disclosure is not limited thereto. That is, the establishment of communication between devices manufactured based on Bluetooth (registered trademark)

guidelines may be mediated. According to the Bluetooth (registered trademark), when a device parameter is notified, the device automatically enters a mode for registering a device which notifies of the device parameter. At this time, according to the Bluetooth (registered trademark), a passkey for establishing connection is requested. Therefore, in the case of Bluetooth (registered trademark), a passkey may be used for mediation instead of the non-registration flag in the above embodiments for DLNA. At this time, the smart phone 200 may generate any passkey and notify devices which are desired for mediating the establishment of communication (for example, the digital camera 100 and the television receiver 300) of the generated passkey.

The above example illustrates the case where the proximity communication is carried out with the tag 500 as the second communication units of the digital camera 100 and the television receiver 300. However the present disclosure is not limited thereto. The digital camera 100 and the television receiver 300 can perform the operation similar to the above even when the third communication unit includes the reader/writer 600. The smart phone 200 should have the third communication unit including the reader/writer 600.

The methods and devices described first and second embodiments are particularly advantageous in the case of mediating the establishment of communication between devices which are difficult to carry or move, such as the television receiver. For example, when communication is desired to be established between one system including a television receiver and a recorder installed at the first floor of a house and another system including a television receiver and a recorder installed at the second floor, the communication can be easily established by using a smart phone easy to carry.

Further, communication can be easily established between devices, that are not easily brought close to each other, such as an air conditioner installed near a ceiling against a wall of a room, a washing machine installed in a washroom or a balcony, and a heat pump device installed outside, by mediating through an electronic device easy to carry such as a smart phone.

In the first embodiment, regardless of whether a communication device touched by the smart phone 200 first (the digital camera 100) and a communication device touched by the smart phone 200 secondarily (the television receiver 300) are registered to each other as counterpart communication device, the smart phone 200 notifies the communication device touched by the smart phone 200 secondarily of a non-registration flag. However, the smart phone 200 may recognize whether the firstly touched communication device and the secondarily touched communication device are registered to each other as the counterpart communication device. The smart phone 200 may notify the secondarily touched communication device of a non-registration flag as well as a device parameter only when they are not registered to each other. For example, in the example of the first embodiment, when the television receiver 300 and the digital camera 100 have been registered, the television receiver 300 stores a device parameter of the digital camera 100. Therefore, when the smart phone 200 touches the television receiver 300, the smart phone 200 may receive the device parameter of the digital camera 100 from the television receiver 300. By receiving the device parameter of the digital camera 100, the smart phone 200 can recognize that the digital camera 100 and the television receiver 300 are registered to each other as the counterpart communication device. In this case, the smart phone 200 may notify the television receiver 300 of only the device parameter of the digital camera 100, and may not notify the television receiver 300 of the non-registration flag.

The electronic device for mediating the establishment of communication in the present disclosure is not limited to smart phones as described above. Any electronic devices capable of exchanging information with another device and executing the procedure of the present disclosure can be used. Further, as to communication devices with which communication is established, the idea of the present disclosure is not limited to the above examples (the digital camera, the television receiver, and the like), and can be widely applied to communication devices that can communicate with another device.

The embodiments have been described as the example of the technique in the present disclosure. For this reason, the accompanying drawings and the detailed description are provided.

Therefore, the components illustrated in the accompanying drawings and the detailed description include not only components essential for solving the problem but also components that are not essential for solving the problem. For this reason, even when these unessential components are illustrated in the accompanying drawings and the detailed description, these unessential components should not be immediately recognized as essential ones.

Since the above embodiments illustrate the technique of the present disclosure, various changes, replacement, addition and omission can be carried out within the scope of claims or equivalent scope of the claims.

INDUSTRIAL APPLICABILITY

The present disclosure can be applied to the technique for establishing the communication between a plurality of communication devices.

What is claimed is:

1. A method for establishing communication between a first communication device and a second communication device, in response to a series of user actions using an electronic device to establish the communication, the series of user actions including a first user's action to bring the electronic device to touch the first communication device, and a second user's action made continuously after the first usr's action to bring the electronic device to touch the second communication device, the method comprising:
  first detecting whether the electronic device becomes within a predetermined distance to the first communication device, regarding the first user's action;
  obtaining, by the electronic device, identification information indicating the first communication device from the first communication device, by using a result of the first detecting as a trigger to obtain the identification information, when detecting that the electronic device becomes within a predetermined distance to the first communication device;
  secondly detecting whether the electronic device becomes within a predetermined distance to the second communication device, regarding the second user's action;
  transmitting, by the electronic device, the identification information and predetermined additional information to the second communication device without receiving a request for the identification information and predetermined additional information from the second communication device, by using a result of the secondly detecting as a trigger to transmit the identification information and the predetermined additional information, when detecting that the electronic device becomes within a predetermined distance to the second communication device; and establishing, by the second communication device, communication with the first communication device by using the identification information and the predetermined additional information, based on a predetermined protocol.

2. The method of claim 1, wherein the predetermined additional information is information indicating that each of the first communication device and the second communication device has not registered each other as a communication counterpart device.

3. The method of claim 1, wherein the electronic device is a smart phone.

4. A method for establishing communication between a first communication device and a second communication device, in response to a series of user actions using an electronic device to establish the communication, the series of user actions including a first user's action to bring the electronic device to touch the first communication device, and a second user's action made continuously after the first user's action to bring the electronic device to touch the second communication device, the method comprising:

first detecting whether the electronic device becomes within a predetermined distance to the first communication device, regarding the first user's action;

transmitting, by the electronic device, predetermined additional information to the first communication device without receiving a request for the predetermined additional information from the first communication device, by using a result of the first detecting as a trigger to transmit the predetermined additional information to the first communication device, when detecting that the electronic device becomes within a predetermined distance to the first communication device;

secondly detecting whether the electronic device becomes within a predetermined distance to the second communication device regarding the second user's action;

transmitting, by the electronic device, the predetermined additional information to the second communication device without receiving a request for the predetermined additional information from the second communication device, by using a result of the secondly detecting as a trigger to transmit the predetermined additional information to the second communication device, when detecting that the electronic device becomes within a predetermined distance to the second communication device, establishing, by the second communication device, the communication with the first communication device using, based on a predetermined protocol.

5. The method of claim 4, wherein the predetermined additional information is information indicating that each of the first communication device and the second communication device has not registered each other as a communication counterpart device.

6. The method of claim 4 wherein the electronic device is a smart phone.

* * * * *